United States Patent Office 2,694,241
Patented Nov. 16, 1954

2,694,241

PROCESS FOR THE PRODUCTION OF MOLDING SAND

Hellmut Freudenberg, Suchteln, Germany

No Drawing. Application February 19, 1951,
Serial No. 211,798

Claims priority, application Germany March 13, 1950

8 Claims. (Cl. 22—217)

It is known that for the production of moulds for the casting of iron, steel and metals, sands having known characteristics must be used. The sand must, on the one hand, be plastic and must also retain the shape impressed thereon during casting in of the molten metal. On the other hand, when the mould is being shaped or pressed from the moulding sand, the sand must not become so compact that enclosed gases or gases released from the casting, and particularly water vapour, cannot escape through the moulding sand.

Previously, for this purpose, sands were employed which in consequence of their natural composition, i. e., as a result of an adequate clay content, have sufficient plasticity. Alternatively moulding sands have been prepared from sands, which themselves have insufficient plasticity but into which, clay of high value is admixed in the desired amount. By special processes of preparation on the one hand, and through careful choice of the sands occurring in natural deposits on the other hand, qualities of sand are obtained for the particular and individual demands of different foundries, which meet the requirements of heat resistance and of permeability with sufficient plasticity.

These measures have meanwhile resulted in the firm view that the plasticity is due to the clay content. The clay does in fact impart the plasticity and also the stability of the mould during casting, but it has the disadvantage that the clay is only heat resistant to a relatively small extent. Moreover it consolidates the sand in such a way that the gas porosity is considerably reduced as the clay content is increased. Relatively narrow limits are consequently imposed upon the addition of clay.

The invention is the result of the discovery that clay is not the only mineral plasticizing means which is suitable for moulding sand. The applicant has found that the mineral glauconite is suitable to a noteworthy extent as a plasticizing means, but only if it is finely distributed in the sand, and is present in any case in finer distribution than is the case in natural deposits. As is known, sands which have already been employed for moulding purposes contain glauconite, as in the case of the so-called green-sands, but the effectiveness of the glauconite as a plasticizing means has not previously been realised. The glauconite is present in these sands as dark granules which may easily be recognised by the naked eye. These sands contain considerable quantities of clay and until the present time this clay content only has been used for the plasticisation of the moulding sand, the clay content being artificially varied in order to change the plasticising properties. Thus clay may be introduced into the sand, or the proportion of clay to sand may be made smaller by the addition of quartz sand. If the clay content in a sand is too small or is artificially extracted, then the sand has no plasticity even if glauconite is present, in the form in which it occurs in natural deposits; if however the glauconite is finely divided in the sand, in a surprising manner a sand is produced, even in the complete absence of clay, which is better suited for foundry purposes than sand containing clay. Such sand has extraordinarily good plastic properties and imparts stability to the mould during casting. Moreover it is essentially more heat resistant than is clay.

According to the invention it is therefore proposed to employ glauconite in fine distribution as plasticising means for sands, which in themselves have unsuitable plasticity for moulding purposes. Glauconite is a hydrated silicate which contains ferrous oxide, alumina, and potassium oxide, and in addition, calcium and magnesium oxide in varying amounts. The chemical composition of the glauconite depends upon its origin or occurrence.

A practically clay-free sand, containing, however, glauconite in fine distribution, makes possible as a result of the properties imparted to it by the glauconite the production of moulds with a minimum amount of water, and moreover the use of such a fine-grained material prevents the mould becoming too compact and having too small a gas permeability. The castings produced in the mould have in consequence a surface which is essentially smoother and more true to shape than has heretofore been attainable.

In general the stability of the mould is greater the higher the content of glauconite. Since, contrary to clay glauconite does not markedly reduce the gas permeability, the glauconite content may be determined merely from the point of view of the required stability. It is therefore possible to obtain previously unattained stabilities, and yet retain good gas permeability.

The production of moulding sands containing glauconite in fine distribution may be effected in many different ways. If for example, the starting material is a clay- and glauconite-containing sand, as is frequently the case in natural deposits, then in accordance with the invention the clay is wholly or partially washed out, so that the sand remaining has preferably a maximum content of foreign substances of about 0.5 to 1%. The method of washing the extremely finely distributed clay out of the clay-containing sand is generally known. Briefly, the sand is mixed with water so as to form a clay suspension in the water. This watery suspension of clay can then be drained away leaving substantially only the sand, i. e. the quartz granules and glauconite. The glauconite in its natural state is present in the sand in the form of granules and has approximately the same specific gravity as quartz. It is therefore quite easy to wash the clay out of the sand whilst retaining the quartz and glauconite. The quartz sand containing granules of glauconite, is then treated, for example in a grinding mill. The abrasive action thus causes the soft glauconite grains to be rubbed upon each other, and to become pulverized and uniformly distributed in the sand, the procedure being such that the quartz grains are retained and are not broken up. The sand, which because of the partial or complete removal of clay is in itself completely non-plastic, becomes extremely plastic due to the presence of the pulverized finely distributed glauconite, so that its feels fatty. It has a high stability against temperatures which occur in casting, but it has, on the other hand, since the glauconite has totally different properties as compared with clay, an essentially higher gas porosity than clay-containing sand of similar grain size and stability.

If only a known proportion of the clay is washed out, the advantages gained by using glauconite are reduced with increasing clay content.

Practically clay-free sand, which often likewise contains glauconite, can be transformed in a simple manner in accordance with the invention into a moulding sand, in that the glauconite-containing sand is pulverized or rolled as the case may be. The fine distribution of the glauconite in the sand resulting from these measures imparts to the sand in a high degree those properties which are necessary for moulding sands.

Obviously, for individual applications of the moulding sand, such as for moulds, cores and so on, it will be arranged that in one case there is more glauconite and in other cases less glauconite in the sand, and it is within the scope of the invention that the finely distributed glauconite content should be varied within wide limits to suit individual requirements.

For that reason also there is a further feature of the invention which consists in obtaining glauconite in more or less pure form and mixing it with a sand which either contains substantially no glauconite or contains glauconite only in amounts which are insufficient to enable said sand to be used for the production of moulds. For this purpose in a further form of the invention the process may be such that first of all the glauconite is extracted in an economic manner. In general practically clay-free, glauconite-containing sand will be the starting material, although a clay-containing sand from which the clay is washed out may also be used. This practically clay free, glauconite-containing sand is pulverized, preferably in an edge mill, it then being possible to wash the glauconite powder out with water or to blow it or screen it out. In this way either a moist glauconite concentrate is obtained or, if necessary, a glauconite powder after drying.

The glauconite concentrate can now be added, in the hydrated condition or in the powder form mentioned, to clay-free quartz sand or sand which is in itself insufficiently plastic, and be finely distributed therein.

This process is particularly useful with non-plastic sands which previously could not be employed for producing moulds; for they can be made plastic by these measures. The proportions of glauconite correspond approximately to the proportions in which highly plastic clay were previously added to the synthetic sand.

The process of the extraction of the glauconite concentrate is not only important for the production of moulding sands, but also for other purposes, for example, for water softening. Previously glauconite, if it did not occur in large amounts in deposits, often had to be extracted from primary deposits from minerals.

This kind of extraction is troublesome and is considerably simplified by the process in accordance with the invention.

In general glauconite is used together with the quartz sand, without the glauconite being specially prepared as, for example, a fertilizer, or also in the moulding sands, in which its presence has previously been tolerated without its properties having been recognised or systematically exploited.

I claim:

1. A process for the production of moulding sand from glauconite-containing sand, substantially free of clay, comprising the steps of subjecting the said sand to a milling treatment by pulverizing the glauconite only and distributing the glauconite intimately throughout the substantially unbroken sand.

2. A process for the production of moulding sand from glauconite-containing sand comprising the steps of washing the said sand to make the latter at least partly clay free, subjecting the said sand to a milling treatment by pulverizing the glauconite only and distributing the glauconite intimately throughout the substantially unbroken sand.

3. A process for the production of moulding sand from glauconite-containing sand, substantially free of clay, comprising the steps of subjecting the said sand to a milling treatment by pulverizing the glauconite only, separating the said pulverized glauconite from the substantially unbroken sand and subsequently adding predetermined portions of the said pulverized glauconite to quartz sand of insufficient plasticity characteristics for moulding purposes.

4. The process, as set forth in claim 3, in which the step of separating the said pulverized glauconite from the substantially unbroken sand is performed by washing out the said pulverized glauconite.

5. The process, as set forth in claim 3, in which the step of separating the said pulverized glauconite from the substantially unbroken sand is performed by blowing out the said pulverized glauconite.

6. The process, as set forth in claim 3, in which the step of separating the said pulverized glauconite from the substantially unbroken sand is performed by screening-out the said pulverized glauconite.

7. The process, as set forth in claim 3, which includes the preliminary step of making the said quartz sand substantially clay free prior to adding the said pulverized glauconite.

8. The process, as set forth in claim 3, in which the said pulverized glauconite is added to the said quartz sand in hydrated condition.

References Cited in the file of this patent

UNITED STATES PATENTS

| Number | Name | Date |
|---|---|---|
| 2,456,769 | Christensen | Dec. 21, 1948 |
| 2,515,194 | Christensen | July 18, 1950 |
| 2,523,996 | Poole | Sept. 26, 1950 |
| 2,578,180 | Edwards | Dec. 11, 1951 |

FOREIGN PATENTS

| Number | Country | Date |
|---|---|---|
| 16,926 | Great Britain | of 1902 |

OTHER REFERENCES

"Refractory Materials, Their Manufacture and Uses" by Searle, pages 77 and 87, published in 1950.

"Clays" by Ries, pages 94 and 118, published in 1927.